March 27, 1928. 1,663,739
C. R. TILLOTSON
PIPE COUPLING
Filed March 29, 1926 2 Sheets-Sheet 1
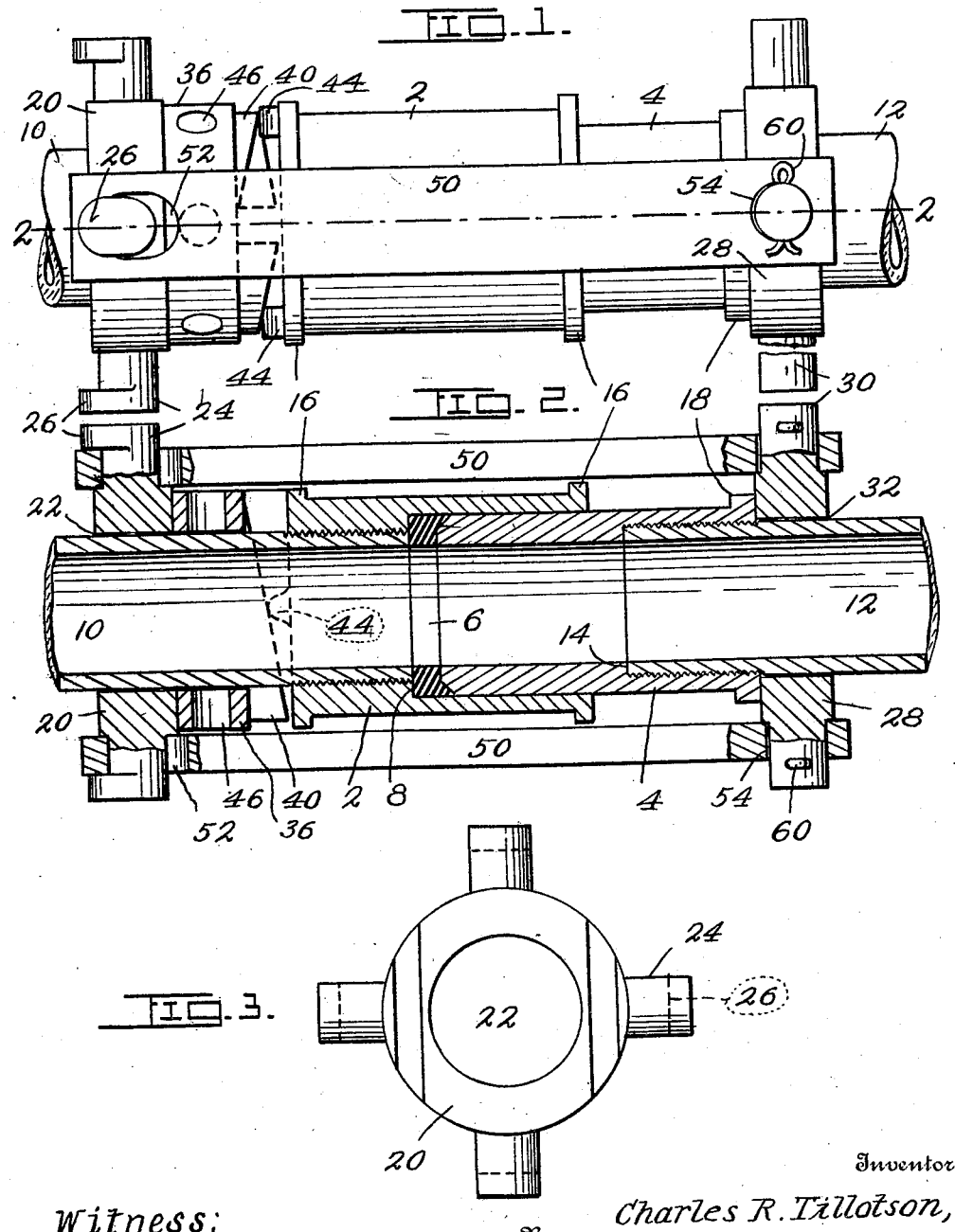
Witness:
Fred C. Fischer.
Inventor:
Charles R. Tillotson,
By F. G. Fischer,
Attorney.

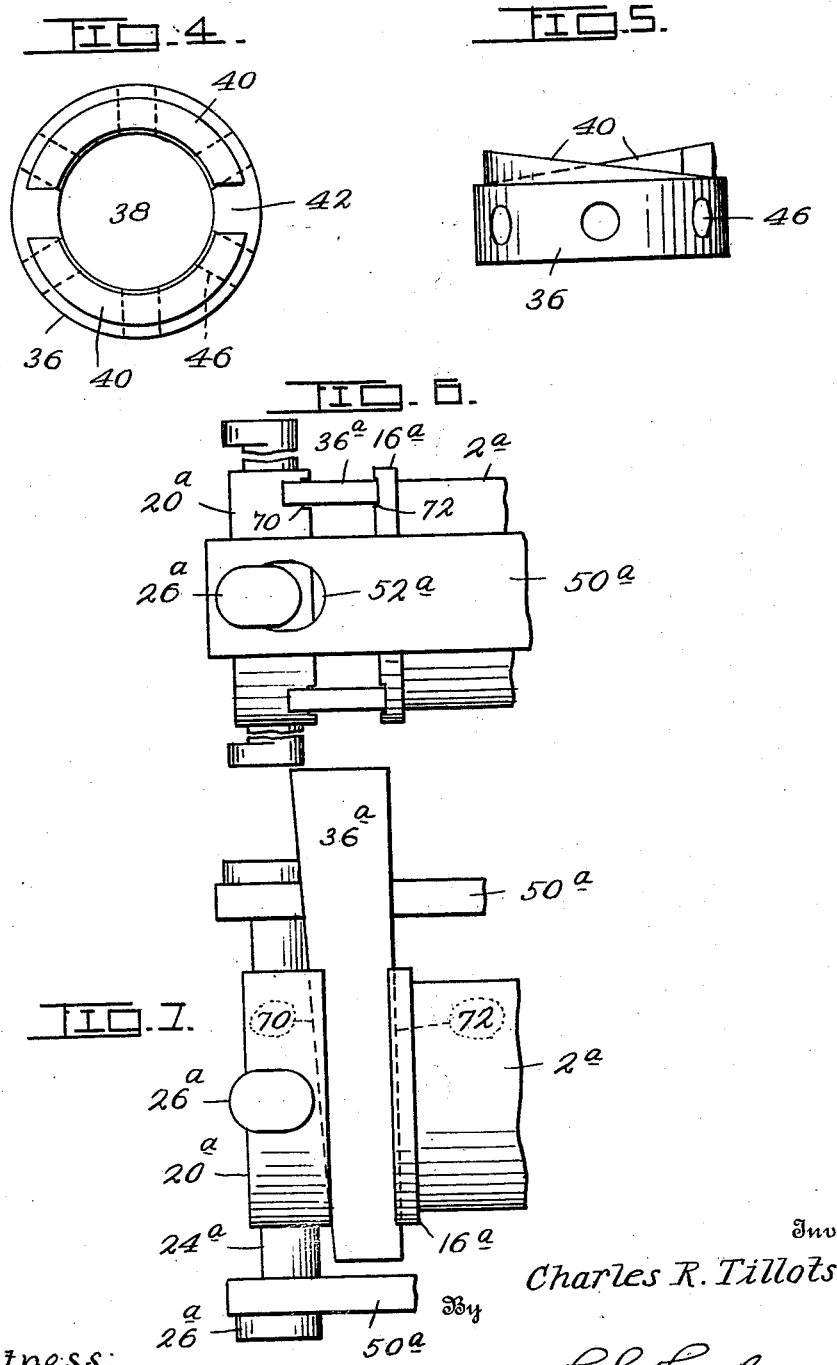

Patented Mar. 27, 1928.

1,663,739

UNITED STATES PATENT OFFICE.

CHARLES R. TILLOTSON, OF CLAY CENTER, KANSAS.

PIPE COUPLING.

Application filed March 29, 1926. Serial No. 98,061.

My invention relates to improvements in pipe couplings and one object is to provide a coupling whereby pipe sections can be quickly connected and disconnected.

A further object is to provide a substantial coupling consisting of but few parts which can be manufactured at a reasonable cost and are not liable to become broken while in use.

Other objects will hereinafter appear, and in order that the invention may be fully understood reference will now be had to the accompanying drawings, in which:

Fig. 1 is a side elevation of a coupling embodying my invention.

Fig. 2 is a central longitudinal section on line 2—2 of Fig. 1.

Fig. 3 is an elevation of a yoke employed in carrying out the invention.

Fig. 4 is a plan view of a rotary wedge member.

Fig. 5 is a side elevation of said rotary wedge member.

Fig. 6 is a plan view of a modified form of the pipe coupling.

Fig. 7 is a fragmentary side elevation of the parts disclosed by Fig. 6.

In carrying out the invention I employ two tubular telescopic members 2 and 4, the latter of which is adapted to fit into the former against a gasket 6 abutting an internal shoulder 8 in the telescopic member 2 and form a water-tight joint. The telescopic members 2 and 4 are internally threaded to receive the threaded ends of pipe sections 10 and 12, respectively, the former of which abuts the gasket 6 while the latter abuts an internal shoulder 14 formed in the member 4. The ends of the member 2 are preferably reinforced with collars 16 while the outer end of the member 4 is preferably reinforced with a collar 18.

20 designates a yoke having a central opening 22 in order that it may slip freely upon the pipe section 10. Said yoke 20 has diametrically opposed radial lugs 24 provided at their outer ends with lips 26, for a purpose which will hereinafter appear.

28 designates another yoke similar to the yoke 20, excepting that its radial lugs 30 are devoid of the lips 26. The yoke 28 has a central opening 32 so that it may freely slip upon the pipe section 12 and abut the collar 18 of the tubular member 4.

36 designates a rotary wedge member having a central opening 38 so that it may slip freely upon the pipe section 10. Said rotary wedge member 36 has a pair of oppositely disposed inclined planes 40, spaced apart as indicated at 42 to admit a pair of diametrically opposed lugs 44 on the adjacent end of the tubular member 2. The wedge member 36 has radial holes 46 extending inwardly from its periphery to the opening 38 to receive a rod whereby it may be rotated upon the pipe section 10.

50 designates a pair of arms provided near their ends with openings 52 and 54, the former openings being elongated as shown by Fig. 1, to fit over the lugs 24 and the lips 26 of the yoke 20.

In practice the yoke 20 and the rotary wedge member 36 are slipped upon the pipe section 10 and the yoke 28 is slipped upon the pipe section 12. The pipe sections 10 and 12 are then threaded into the tubular members 2 and 4, the latter of which is slipped into the former until its inner end abuts the gasket 6. The arms 50 are then placed in position upon the lugs 24 and 30 of the yokes 20 and 28, respectively, the rotary wedge member 36 being adjusted to bring the spaces 42 into registry with the lugs 44. After the arms 50 have been placed in position upon the lugs as stated, the wedge member 36 is rotated to cause the inclined planes 40 to bear against the lugs 44 with increasing pressure and force the coupling member 2 and the yoke 20 in opposite directions, thereby causing the latter to pull the arms 51 longitudinally in a direction to draw the yoke 28 against the tubular member 4 and force the same inwardly against the gasket 6, thus forming a leak-proof joint. The arms 50 are reliably held upon the lugs 24 and 30 by the lips 26 and cotter pins 60, which latter are passed through holes in said lugs 30. The coupling can be readily disconnected by reversing the above operation.

On the larger size couplings four arms 50 may be used instead of two to give additional strength.

In the modified form shown by Figs. 6 and 7, the contruction of the parts is substantially the same as in the preferred form, as is evident by corresponding reference characters with exponents "a," the chief difference being that tapered wedge members 36$^a$ are substituted for the rotary wedge members 36, the adjacent ends of the yoke 20$^a$ and the tubular member 2$^a$ being provided with grooves 70 and 72, respectively, to receive said wedge members 36ª and prevent the same from becoming laterally displaced while being driven between the yoke 20ª and the tubular member 2ª.

From the foregoing description, taken in connection with the drawings, it is apparent that I have provided a pipe coupling embodying the advantages above pointed out, and while I have shown two forms of the invention I reserve the right to all such other forms and modifications as properly fall within the spirit and scope of the invention as claimed.

Having thus described my invention, what I claim and desire to secure by Letters Patent, is:

1. In a pipe coupling, two interengaging telescopic tubular members adapted to be connected at their outer ends to pipe sections, yokes slidably mounted upon said pipe sections and one of which is adapted to abut one end of the adjacent tubular member, lugs projecting from said yokes, arms with openings to receive said lugs, lips on the lugs of one yoke for overlapping the adjacent portions of said arms, and wedge means adapted to be driven between one of said yokes and the adjacent tubular member for forcing them apart and drawing the other yoke firmly against the adjacent tubular member.

2. In a pipe coupling, two interengaging telescopic tubular members adapted to be connected at their outer ends to pipe sections and one of said members having an internal shoulder, a gasket interposed between said shoulder and the inner end of the companion tubular member, yokes fitting loosely upon said pipe sections, arms uniting said yokes, and means interposed between one of said yokes and the adjacent tubular member for forcing them apart and drawing the other yoke firmly against the companion tubular member.

In testimony whereof I affix my signature.

CHARLES R. TILLOTSON.